United States Patent
Zhu et al.

(10) Patent No.: US 10,694,417 B2
(45) Date of Patent: Jun. 23, 2020

(54) METHODS AND DEVICES FOR DOWNLINK FLOW CONTROL IN WIRELESS COMMUNICATION SYSTEMS

(71) Applicant: Telefonaktiebolaget LM Ericsson (publ), Stockholm (SE)

(72) Inventors: Huaisong Zhu, Beijing (CN); Qianxi Lu, Beijing (CN); Zhan Zhang, Beijing (CN)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 16/067,391

(22) PCT Filed: Jan. 7, 2016

(86) PCT No.: PCT/CN2016/070381
§ 371 (c)(1),
(2) Date: Jun. 29, 2018

(87) PCT Pub. No.: WO2017/117776
PCT Pub. Date: Jul. 13, 2017

(65) Prior Publication Data
US 2019/0028918 A1 Jan. 24, 2019

(51) Int. Cl.
*H04W 28/02* (2009.01)
*H04W 24/10* (2009.01)
(Continued)

(52) U.S. Cl.
CPC .......... *H04W 28/0236* (2013.01); *H04L 5/00* (2013.01); *H04L 47/34* (2013.01); *H04W 24/10* (2013.01);
(Continued)

(58) Field of Classification Search
CPC .......... H04W 28/0236; H04W 72/042; H04W 28/12; H04W 28/065; H04W 28/02; H04W 24/10; H04L 47/34; H04L 5/00
See application file for complete search history.

(56) References Cited

U.S. PATENT DOCUMENTS 9,648,514 B2 * 5/2017 Blankenship ......... H04L 69/322
2018/0175923 A1 * 6/2018 Liang ..................... H04B 7/024
(Continued)

FOREIGN PATENT DOCUMENTS

CN 101895921 A 11/2010
CN 101932080 A 12/2010
(Continued)

OTHER PUBLICATIONS

PCT International Search Report for International application No. PCT/CN2016/070381—dated Sep. 20, 2016.
(Continued)

*Primary Examiner* — Brian T O Connor
(74) *Attorney, Agent, or Firm* — Patent Portfolio Builders, PLLC (57) ABSTRACT

One embodiment of the present disclosure relates to a method for operating in a terminal device for downlink flow control. The terminal device receives duplicated packets from a first network node device and one or more secondary network node devices. The method comprises measuring downlink transmission information for the first network node device and the one or more secondary network node devices; deciding downlink flow control information based on the measured downlink transmission information; and sending the downlink flow control information to at least the first network node device. According to other aspects of the present disclosure, there are provided corresponding methods and devices.

16 Claims, 5 Drawing Sheets

(51) Int. Cl.
*H04L 12/801* (2013.01)
*H04L 5/00* (2006.01)
*H04W 28/06* (2009.01)
*H04W 28/12* (2009.01)
*H04W 72/04* (2009.01)

(52) U.S. Cl.
CPC ......... *H04W 28/02* (2013.01); *H04W 28/065* (2013.01); *H04W 28/12* (2013.01); *H04W 72/042* (2013.01)

(56) References Cited

U.S. PATENT DOCUMENTS

2018/0352507 A1* 12/2018 Zhang .................. H04W 28/08
2019/0075484 A1* 3/2019 Mishra .................. H04W 8/22

FOREIGN PATENT DOCUMENTS

| | | |
|---|---|---|
| CN | 102843715 A | 12/2012 |
| CN | 103259615 A | 8/2013 |
| KR | 20150133617 A | 11/2015 |
| WO | 2015 116877 A1 | 8/2015 |

OTHER PUBLICATIONS

PCT Written Opinion of the International Searching Authority for international application No. PCT/CN2016/070381—dated Sep. 20, 2016.
Extended European Search Report for Application No./Patent No. 16882921.6-1215 / 3400744 PCT/CN2016070381—dated Jun. 3, 2019.

* cited by examiner

METHODS AND DEVICES FOR DOWNLINK FLOW CONTROL IN WIRELESS COMMUNICATION SYSTEMS

PRIORITY

This nonprovisional application is a U.S. National Stage Filing under 35 § 371 of International Patent Application Serial No, PCT/CN2016/070381 filed Jan. 7, 2016, and entitled "METHODS AND DEVICES FOR DOWNLINK FLOW CONTROL IN WIRELESS COMMUNICATION SYSTEMS" which is hereby incorporated by reference in its entirety.

TECHNICAL FIELD

The present disclosure generally relates to wireless communication, particularly to methods and devices for flow control in downlink multi-point diversity.

BACKGROUND

This section is intended to provide a background to the various embodiments of the invention that are described in this disclosure. The description herein may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

The $3^{rd}$ Generation Partner Project (3GPP) has discussed Coordinated-Multiple-Points (CoMP) as a typical case among existing multi-point diversity schemes. Among different modes for Downlink (DL) CoMP implementation, joint transmission is a one feasible way to increase diversity, i.e., multiple access points transmit the same signal to the same user equipment (UE) simultaneously with the same time-frequency resources. The signals from different access points are encoded so that they coherently combine in the air when they reach the UE. It is transparent to the UE that it is served by multiple points if a UE specific demodulation reference signal (DM-RS) is utilized and coherently transmitted by all access points. The signals from the different points should meet strict timing and phasing requirements so that the signals from different points are constructively combined. This has the effect of improving the signal to noise and interference ratio (SINR) at the UEs, and thus improves the robustness of the link.

A 5G system (e.g., microwave network) may work at higher radio frequency bands than a Long Term Evolution (LTE) system. Due to a high-frequency radio up to microwave frequency, many factors such as terminal rotation, several-meters-sized obstacles and UE mobility would lead to link quality fluctuations on different time scales. At the same time, higher requirements for both high reliability and low delay may be put on the 5G system due to specific traffic types. To meet this requirement, the suitability of higher frequency bands should be enhanced by transmission and/or reception diversity, such as multi-point diversity. In other words, diversity are needed to provide significant gain for 5G Radio Access Technologies, especially when working at higher frequency bands, e.g., above 6 GHz.

In 3G (e.g., UMTS (Universal Mobile Telecommunications System) Terrestrial Radio Access Network (UTRAN)) and 4G (e.g., Evolved UMTS Terrestrial Radio Access Network (E-UTRAN)) systems, the implementation of the multiple point connectivity is supported by the flow control technique, by which the duplicated downlink data transmissions from multiple access points to UE can be managed at network side. In the existing flow control solutions, the network relies on the UE measurement feedback to a relevant network node (e.g., Radio Network Controller (RNC) for UTRAN, a master evolved NodeB (MeNB) for E-UTRAN) to make the flow control decision, and then the result of the flow control decision is informed via backhaul to the access points that serve the UE.

However, in the 5G systems, the network-based flow control solutions become limited at least because of much weaker or shaky radio link in high-frequency spectrum and backhaul latency.

With increasing carrier frequency, the radio propagation becomes more shaky compared to lower frequency, due to for example, UE rotation, obstacles and UE mobility. Consequently, for the network-based flow control solutions that rely on UE measurement feedback, the successful transmission of UE measurement report to a particular access point (e.g., the master eNB) would be a premise of the flow control to take effect. When the transmission link between the UE and the access point crashes, the flow control function would not run successfully.

On the other hand, backhaul latency may also cause performance degradation. With the improvement of air interface capability discussed in 5G scope, the collision between high capability air interface and limited bandwidth in backhaul network become more and more clear. The latency for the network side to act on the channel quality change may consist of the following factors:

Backhaul latency: Iub/X2 round-trip time (RTT) for RNC/MeNB to get information from NodeBs (i.e., master NodeB and secondary NodeB (s))/secondary eNB (s) (SeNBs), and send packets to NodeBs/SeNB(s) based on the flow control decision;

Radio link latency: Radio Link Control Layer (RLC) RTT for NodeBs/SeNB to get an acknowledgement message from UE.

With the improvement of 5G air interface, the radio link latency can be significantly reduced, but not for the backhaul latency, which may form the bottleneck that limits the flow control performance.

Therefore, there is a need to provide a new flow control solution for downlink multi-point diversity in 5G mobile communication networks.

SUMMARY

One or more method and apparatus embodiments according to the present disclosure aim to provide one or more solutions for flow control in downlink multi-point diversity.

According to the first aspect of the present disclosure, there is provided a method for operating in a terminal device for downlink flow control in a multi-point diversity scenario. The terminal device is configured to receive duplicated packets from a first network node device and one or more secondary network node devices. The method comprises measuring downlink transmission information for the first network node device and the one or more secondary network node devices; deciding downlink flow control information based on the measured downlink transmission information; and sending the downlink flow control information to at least the first network node device.

According to the second aspect of the present disclosure, there is provided a method for operating in a first network node device for downlink flow control. The first network node device along with one or more secondary network node devices transmits duplicated packets to a terminal device in a downlink multi-point diversity scenario. The method comprises: receiving from the terminal device downlink flow control information which is decided by the terminal device; performing subsequent data delivery based on the downlink flow control information.

According to the third aspect of the present disclosure, there is provided a terminal device, which is configured to receive duplicated packets from the first network node device and one or more secondary network node devices in a downlink multi-point diversity scenario. The terminal device comprises: a measuring unit configured to measure downlink transmission information for a first network node device and one or more secondary network node devices; a flow control unit configured to decide downlink flow control information based on the measured downlink transmission information; and a sending unit configured to send the downlink flow control information to at least the first network node device.

According to the fourth aspect of the present disclosure, there is provided a first network node device, which is configured to transmit, along with one or more secondary network node devices, duplicated packets to a terminal device. The first network node device comprises: a receiving unit configured to receive from the terminal device downlink flow control information which is decided by the terminal device; and a control unit configured to perform subsequent data delivery based on the downlink flow control information.

According to the fifth aspect of the present disclosure, there provides an apparatus for operating in a terminal device for downlink flow control. The terminal device is configured to receive duplicated packets from a first network node device and one or more secondary network node devices. The apparatus comprises: means for causing to measure downlink transmission information for the first network node device and the one or more secondary network node devices; means for causing to decide downlink flow control information based on the measured downlink transmission information; and means for causing to send the downlink flow control information to at least the first network node device.

According to the sixth aspect of the present disclosure, there provides an apparatus for operating in a first network node device for downlink flow control. The first network node device along with one or more secondary network node devices is configured to transmit duplicated packets to a terminal device. The apparatus comprises: means for causing to receive from the terminal device downlink flow control information which is decided by the terminal device; and means for causing to perform subsequent data delivery based on the downlink flow control information.

According to the seventh aspect of the present disclosure, there provides a terminal device which is configured to receive duplicated packets from a first network node device and one or more secondary network node devices. The terminal device comprises processing means adapted to: cause to measure downlink transmission information for the first network node device and the one or more secondary network node devices; cause to decide downlink flow control information based on the measured downlink transmission information; and cause to send the downlink flow control information to at least the first network node device.

According to the eighth aspect of the present disclosure, there provides a first network node device, which is configured to transmits, along with one or more secondary network node devices, duplicated packets to a terminal device. The first network node device comprises processing means adapted to: cause to receive from the terminal device downlink flow control information which is decided by the terminal device; and cause to perform subsequent data delivery based on the downlink flow control information.

According to one or more embodiments of the present disclosure, the terminal device is allowed to make a decision of the downlink flow control based on its internal measurement of the downlink transmission information for the first and secondary network node devices, which is serving the terminal device in the downlink multi-point diversity mode. In this way, the flow control reactivation speed can be increased because unnecessary backhaul latency introduced by inter-network-node communications and radio link latency introduced by the measurement feedback from the terminal device can be avoided.

BRIEF DESCRIPTION OF THE DRAWINGS

Inventive features regarded as the characteristics of the present invention are set forth in the appended claims. However, the present invention, its implementation mode, other objectives, features and advantages will be better understood through reading the following detailed description on the exemplary embodiments with reference to the accompanying drawings, where in the drawings:

DETAILED DESCRIPTION

Hereinafter, embodiments of the present disclosure will be described with reference to the accompanying drawings. In the following description, many specific details are illustrated so as to understand the present disclosure more comprehensively. However, it is apparent to the skilled in the art that implementation of the present invention may not have these details. Additionally, it should be understood that the present invention is not limited to the particular embodiments as introduced here. On the contrary, any combination of the following features and elements may be considered to implement and practice the present invention, regardless of whether they involve different embodiments. For example, while it is described below in the context of 5G cellular communication system for illustrative purposes, those skilled in the art will recognize that one or more embodiments of the present disclosure can also be applied to various other types of cellular communication systems. Thus, the following aspects, features, embodiments and advantages are only for illustrative purposes, and should not be understood as elements or limitations of the appended claims, unless otherwise explicitly specified in the claims.

A terminal device may comprise, be implemented as, or known as an access terminal, a subscriber station, a subscriber unit, a mobile station, a remote station, a remote terminal, a user terminal, a user agent, a user device, user equipment (UE), a user station, or some other terminology.

In some implementations an access terminal may comprise a cellular telephone, a cordless telephone, a Session Initiation Protocol (SIP) phone, a personal digital assistant (PDA), a handheld device having wireless connection capability, a Station (STA), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

An network node device may comprise, be implemented as, or known as NodeB, Radio Network Controller (RNC), eNodeB (eNB), Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or some other terminology.

Figure 1:
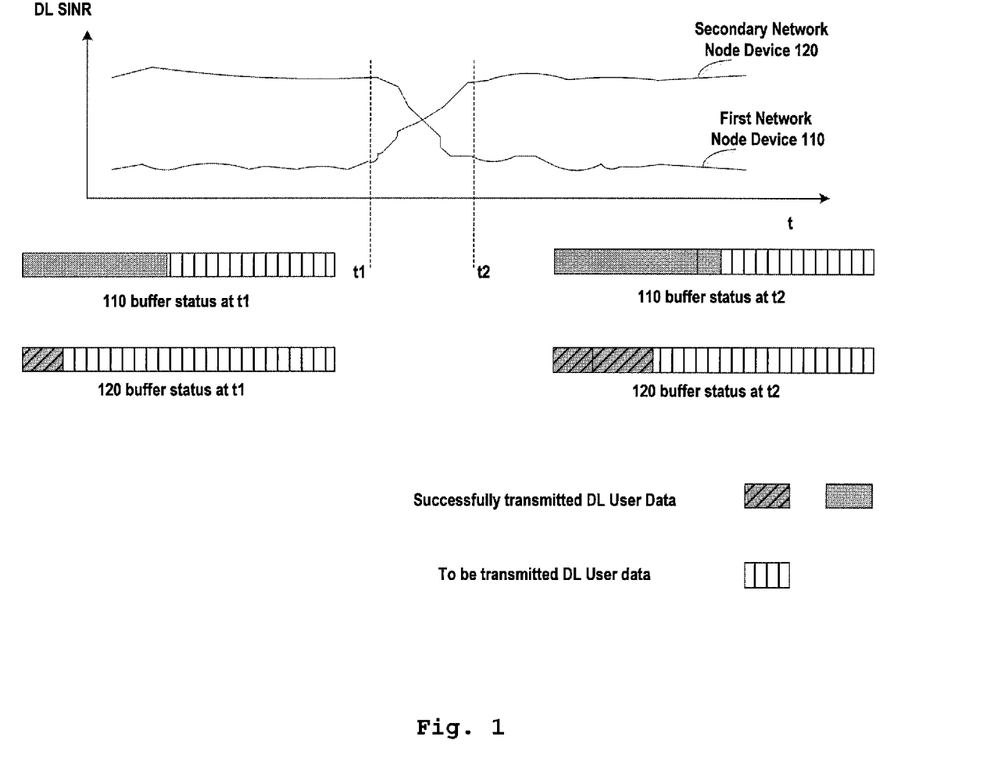
FIG. 1 is a diagram schematically illustrating downlink data transmission in the downlink multi-point diversity scenario, which can be improved by implementing various embodiments of the present disclosure.

FIG. 1 is a diagram schematically illustrating downlink data transmission in the downlink multi-point diversity scenario, which can be improved by implementing various embodiments of the present disclosure.

As shown in the FIG. 1, in the downlink multi-point diversity, 2 network node devices, for example a first or master network node device 110 and one secondary network node device 120, are connected with a terminal device (not shown), and the terminal device receives duplicated data simultaneously from both the first and secondary network node devices 110, 120. Although for the purpose of conciseness and clearness of the depiction, only one secondary network node device 120 is described with reference of FIG. 1, a person skilled in the art appreciates that the terminal device can be served by one or more secondary network node devices, which does not constitute any limitation in the scope of the invention concept of the present disclosure.

Before time point of t1, the link quality of the first network node device 110 is greatly better than the secondary network node device 120. In that situation, the terminal device actually receives most of data from the first network node device 110 because the data of the secondary network node device 120 cannot be successfully delivered due to poor link quality.

But from time point t1 to t2, the link quality of the secondary network node 120 becomes better than the first network node device 110, for example due to terminal rotation or mobility. Without flow control, the improved connection between the secondary network node device 120 and the terminal device is only used to deliver the pending packets which have been delivered successfully by the first network node device 110 already.

From the terminal device's perspective, it indeed does not get any gain from the transmission diversity in the time period of t1~t2, due to the obsolete data being transmitted from the secondary network node device 120 to the terminal device. With proper flow control, the obsolete data in the secondary network node device's buffer can be dropped/abandoned before delivery. The network can make use of the time period from t1 to t2 to deliver those packets which have not been successfully delivered by the first network node device 110, and thus fully explore the diversity gain.

As mentioned above, in the existing 3GPP flow control solutions, the flow control decision is made on the network side.

For example, in the multi-flow High Speed Downlink Packet Access (HSDPA) of UTRAN, the flow control decision is made by a RNC that serves UE. The RNC decides how to split downlink data stream between neighboring NodeBs based on NodeB capacity and UE capacity. The NodeB capacity may be indicated by transport capacity, NodeB hardware processing capacity among others. The information indicative of NodeB capacity is obtained via measurement by Master NodeB and Slave NodeB measurement and sent back to RNC via backhaul for final flow control decision. For UE capacity, this information is obtained by UE measurement and sent back to RNC via radio link (e.g., Radio Resource Control (RRC) signaling) for final flow control decision.

Another example is dual connectivity in E-UTRAN, the flow control decision is made by the Master eNB (MeNB) that serves UE. The MeNB decides how to split downlink data stream between itself and other Secondary eNB(s) (SeNB(s)) based on NodeB capacity and UE capacity. Here, the NodeB capacity may be indicated by X2 transport capacity, eNB hardware processing capacity among others. The information indicative of NodeB capacity is obtained by MeNB internal and Slave NodeB measurement, which is sent back to MeBN via backhaul (e.g., X2 signaling between MeNB and SeNB (s)) for final flow control decision. For UE capacity, this information is obtained by UE measurement and sent back to MeNB via radio link (e.g., RRC signaling) for final flow control decision.

It can be seen that both in the multi-flow HSDPA of UTRAN and the dual connectivity of E-UTRAN, the flow control decision is network-based. The network relies on the UE measurement feedback to a relevant network node, and then the result of the flow control decision is informed via backhaul to the network node devices that serve the UE.

The present disclosure provides one or more embodiments for terminal-device-assisted flow control, whereby the downlink transmission information is obtained by the terminal device local measurement, and the terminal device makes the decision or suggestion on the downlink data delivery routing on the multiple connectivity and sends commands to at least one network node device serving the terminal device directly.

With reference to FIGS. 2-6, various embodiments of the present disclosure are described in details.

Figure 2:
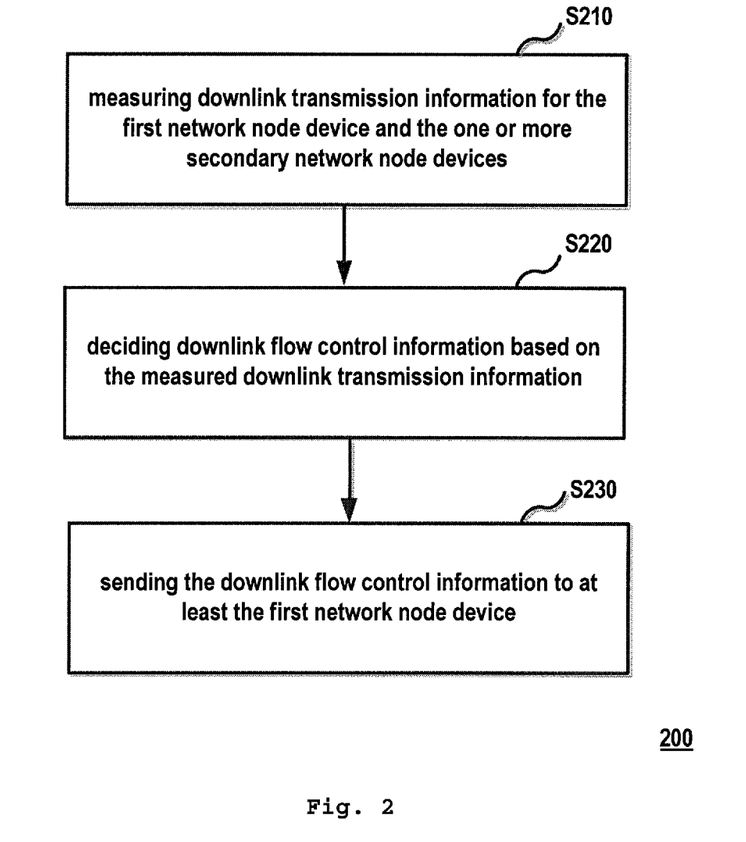
FIG. 2 is a diagram schematically illustrating an exemplary flow chart of a method for operating in a terminal device for downlink flow control according to one or more embodiments of the present disclosure.

FIG. 2 is a diagram schematically illustrating an exemplary flow chart of a method 200 for operating in a terminal device for downlink flow control according to one or more embodiments of the present disclosure.

The terminal device is served by a first network node device and one or more secondary network node devices in the downlink multi-point diversity scenario where the terminal device receives duplicated downlink packets from the first network node device and the one or more secondary network node device.

As shown in FIG. 2, the method 200 begins at step S210. In step S210, the terminal device is configured to measure downlink transmission information for the first network node device and the one or more secondary network node devices. In step S220, the terminal device is allowed to decide downlink flow control information based on the measured downlink transmission information. The downlink flow control information may generally indicate how to perform the flow control, i.e., to deliver which packets to the terminal device via the access link afterwards. In step S230, this decided downlink flow control information is then sent to at least the first network node device, which may be configured to perform the flow control on the downlink transmission based on the received downlink flow control information or made a further flow control decision with consideration of the received downlink flow control information by itself. The processing of the network node side according to various embodiments of the present disclosure will be described in more details with reference to FIG. 3.

Additionally, according to an embodiment, the terminal device may further send the downlink flow control information to the one or more secondary network node devices directly via radio links, so as to further reduce the latency caused by using backhaul to transmit the downlink flow control information from the first network node device to the one or more secondary network node devices.

According to one or more embodiments of the present disclosure, the downlink transmission information measured by the terminal device may include, among others, signal qualities for the first network node device and the one or more secondary network node devices, which can be measured directly at the terminal side by using any appropriate signal quality estimation scheme.

Additionally or alternatively, the downlink transmission information may include, among others, downlink scheduling information for the first network node device and the one or more secondary network node devices. This information may be available at terminal side if the terminal device is also designed to assist radio resource allocation of the multi-point diversity mode.

Additionally or alternatively, the downlink transmission information may also include, among others, a downlink transmission status, which can be determined from the received data packet by the terminal device. It should be appreciated that since the terminal device receives duplicated downlink data from both the first and secondary network node devices simultaneously, the downlink transmission status may be measured based on the status of data that already successfully received by the terminal device. In one example embodiment of the present disclosure where the flow control scheme is implemented based on a packet data convergence protocol (PDCP) layer, the downlink transmission status may be measured by a highest sequence number of PDCP data units that the terminal device successfully received. That is because from PDCP layer's point of view, lower layer already provides in-sequence delivery of the downlink data transmission. In another example embodiment of the present disclosure where the flow control scheme is implemented based on a radio link control (RLC) layer, since RLC layer actually processes non-in-sequence RLC packets, the downlink transmission status may be measured by a receiving sliding window status in the RLC layer; and already-received stream sequence numbers or non-received stream sequence numbers.

Although the downlink transmission information has been described in conjunction with the above specific examples, it should be noted that the downlink transmission information that can be used by the terminal device to make the flow control decision may not be limited to those examples and any of their combinations. Those skilled in the art may select, additionally or alternatively, any other suitable parameters or measurements for downlink transmission so as to facilitate the flow control decision at the terminal device.

According to one or more embodiments of the present disclosure, in step S220 of deciding downlink flow control information, the terminal device may determine which network node device should be connected to perform subsequent downlink transmission, for example, based on the signal qualities for the first and secondary network node devices, which is measured by the terminal device. In one or more other embodiments of the present disclosure, the terminal device may additionally or alternatively determine from which packet the first network node device and the one or more secondary network node subsequently deliver the downlink duplicated packets to the terminal device, for example, based on the evaluated downlink transmission status.

Figure 3:
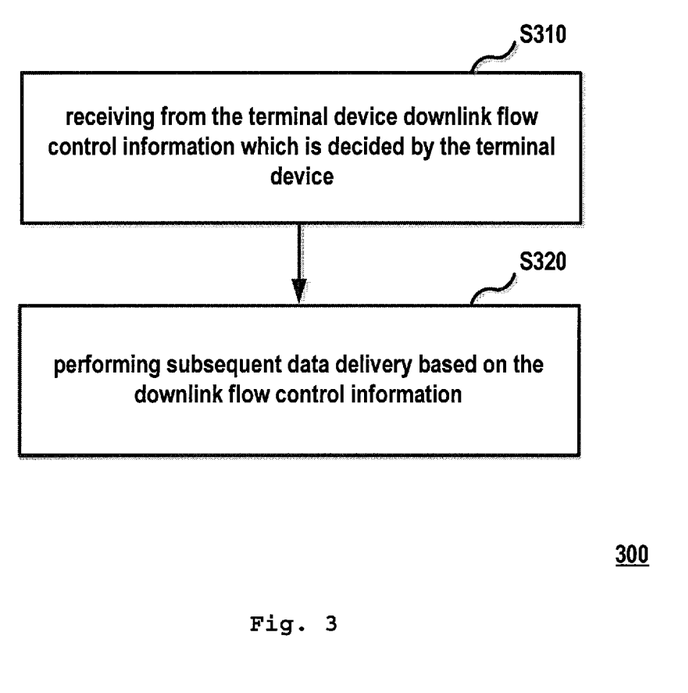
FIG. 3 is a diagram schematically illustrating an exemplary flow chart of a method for operating in a first network node device for downlink flow control according to one or more embodiments of the present disclosure.

FIG. 3 is a diagram schematically illustrating an exemplary flow chart of a method 300 for operating in a first network node device for downlink flow control according to one or more embodiments of the present disclosure.

As described above, in the downlink multi-point diversity scenario, a terminal device is served by the first network node device and one or more secondary network node devices. The first network node device may send duplicated packets to the one or more secondary network node devices via backhaul, and then both the first and secondary network node devices deliver the duplicated downlink packets to the terminal device.

As shown in FIG. 3, in step S310, the first network node device receives from the terminal device downlink flow control information which is decided by the terminal device.

According to one or more embodiments of the present disclosure, the downlink flow control information may include information indicating which network node device is connected based on the signal qualities for the first network node device and the one or more secondary network node devices. In some embodiments of the present disclosure, the downlink flow control information may additionally or alternatively include information indicating from which packet the first network node device and the one or more secondary network node subsequently deliver the duplicated packets to the terminal device.

In step S320, the first network node device performs subsequent data delivery based on the received downlink flow control information.

In some embodiments, the first network node device may need to send the downlink flow control information to each of the one or more secondary network node devices via backhaul, for example, in the case that the terminal device is configured to only communicate its flow control decision with the first network node device that serves it. In an alternative embodiment, even in the case that the terminal device does inform both the first and secondary network node devices of the downlink flow control information, the first network node device may also follow the traditional way to relay the flow control information to each other via backhaul, so that the secondary network node devices would follow the command which arrived earlier either from the terminal device directly via radio link or from the first network node device via backhaul in a relayed way. By such an approach, the robustness may be increased with respect to the wireless link weakness.

According to one or more embodiments of the present disclosure, the step S320 of performing subsequent data delivery based on the received downlink flow control information may comprise a network-based flow control decision based on the downlink flow control information. In those embodiments, while taking the downlink flow control information into consideration, the first network node device may also make its own flow control decision to decide network flow control information. The first network node device may then inform each of the secondary network nodes of the resulted network flow control information instead of relaying the received flow control information from the terminal device.

Figure 4:
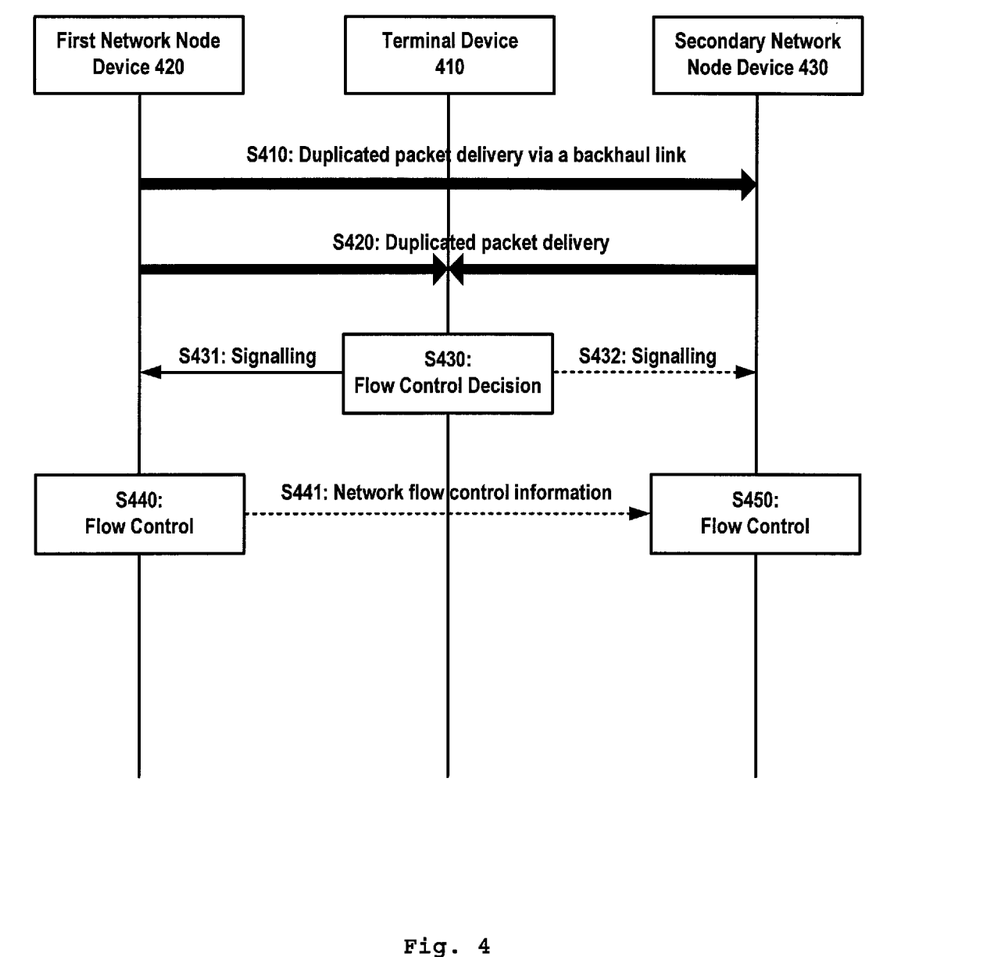
FIG. 4 is an example diagram illustrating data and signaling communications according to an embodiment of the present disclosure.

FIG. 4 is an example diagram illustrating data and signaling communications according to an embodiment of the present disclosure.

In the embodiment as illustrated in FIG. 4, a terminal device 410 operates in the downlink multi-point diversity mode with a first network node device 420 and a secondary network node device 430 so that it can receive duplicated downlink packets from both the first and second network node devices.

In step S410, duplicated packets are sent from the first network node device 420 to the secondary network node device 430 via backhaul, and then both first and secondary network node devices deliver, in step S420, the duplicated packets to the terminal device 410.

In step S430, it is the terminal device 410 to make downlink flow control decision on packet delivery according to downlink transmission information. The available input for the flow control decision may include but not limited to any of the following items:

signal qualities for the first network node device 420 and the secondary network node device 430;

downlink scheduling information for the first network node device 420 and the secondary network node device 430;

a downlink transmission status, which may be measured based on the status of data that already successfully received by the terminal device.

In one example embodiment of the present disclosure where the flow control scheme is implemented based on a PDCP layer, the downlink transmission status may be measured by a highest sequence number of PDCP data units that the terminal device 410 successfully received either from the first network node device 420 or from the secondary network node device 430.

In another example embodiment of the present disclosure where the flow control scheme is implemented based on the RLC layer, since RLC layer actually processes non-in-sequence RLC packets, the downlink transmission status may be measured by a receiving sliding window status in the RLC layer; and already-received stream sequence numbers or non-received stream sequence numbers.

In step S431, the terminal device 410 directly sends the downlink flow control information to the first network node device 420 via radio link, for example, by using a piggyback signaling or a newly-defined data plane signaling.

As an alternative step, the terminal device 410 may directly send, in step 432, the downlink flow control information to the secondary network node device 430 via radio link. Similarly, the downlink flow control information may be carried by a piggyback signaling or a newly-defined data plane signaling from the terminal device 410 to the secondary network node device 430.

Although not shown in FIG. 4, there may be an additional or alternate step of relaying the received downlink flow control information from the first network node device 420 to the secondary network node device 430 via backhaul. In particular, when implementing in conjunction with step S432, this traditional way of relaying the flow control decision via backhaul may benefit the situation where the terminal device 410 instantly loses connectivity with the secondary network node device 430, as the secondary network node device 430 would follow the relayed flow control information from the first network node device 420.

Based on the downlink flow control information that received from the terminal device 410, the first network node device 420 and the secondary network node device 430 execute the flow control in steps S440 and S450, respectively. Dependent upon the layer where the flow control scheme is implemented, the flow control steps S440 and S450 may be implemented in different forms:

To route duplicated packets which have not been sent to the terminal device 410 from any of the first and secondary network node devices 420, 430, which is basically the same functionality as by PDCP in dual connectivity;

To prevent the unnecessary re-transmission at RLC layer, i.e., if a packet has been received by the terminal device 410 successfully in one of the two connection links of the terminal device 410 (i.e., from the first network node device 420 to the terminal device 410 and from the secondary network node device 430 to the terminal device 410), it is not needed to do the ARQ re-transmission (if it is NACKed by the terminal device 410) in the other of the two links.

In some embodiments, network overriding the terminal device's flow control decision may be allowed. The first network node device 420 may decide the network flow control information at least based on the downlink flow control information that determined by the terminal device and send the network flow control information to the secondary network node device 430 via backhaul, in step S441. That means, the terminal-based flow control mechanism according to the various embodiments of the present disclosure can be used in combination of network-based flow control mechanism, which may provide more flexibility for system design and implementation.

Figure 5:
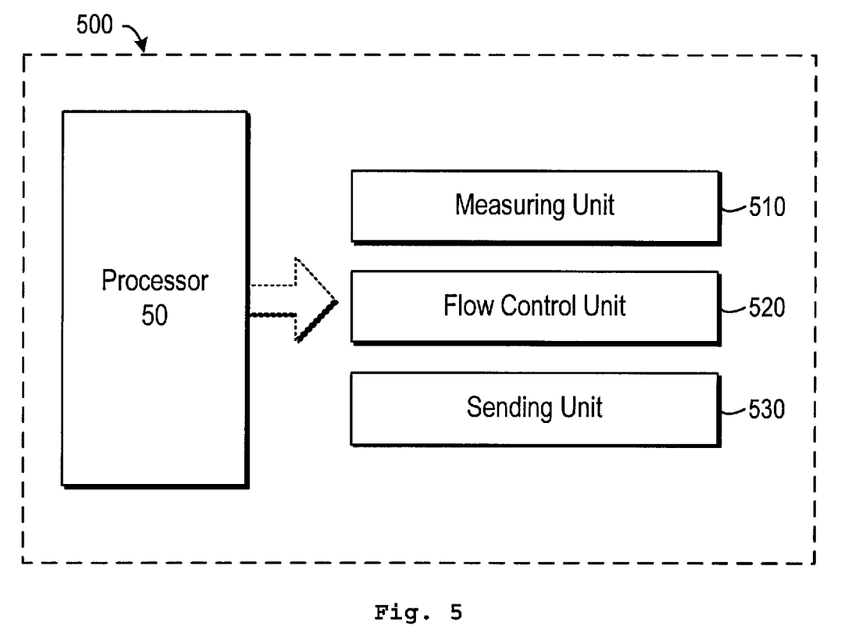
FIG. 5 is an example block diagram schematically illustrating a terminal device according to one or more embodiments of the present disclosure.

FIG. 5 is an example block diagram schematically illustrating a terminal device according to one or more embodiments of the present disclosure.

As shown in FIG. 5, the terminal device 500 is configured to operate in the downlink multi-point diversity scenario where the terminal device 500 receives duplicated packets from a first network node device and one or more secondary network node devices. The terminal device 500 comprises a measuring unit 510, a flow control unit 520, a sending unit 530. The terminal device 500 may also comprise multiple suitable radio frequency transceivers (not shown in FIG. 5) that may be operably coupled with one or more antenna(s) (not shown in FIG. 5) which are used to transmit signals to, and receive signals from, other radio nodes such as a NodeB, an eNodeB or a WiFi AP.

The terminal device 500 comprises a processor 50, which may include one or more microprocessor or microcontrollers, as well as other digital hardware, which may include digital signal processors (DSPs), special-purpose digital logic, and the like. The processor 50 may be configured to execute program code stored in memory (not shown in FIG. 5), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processor 50 may be used to cause the measuring unit 510, the flow control unit 520, the sending unit 530 to perform corresponding functions according one or more embodiments of the present disclosure.

The measuring unit 510 is configured to measure downlink transmission information for the first network node device and the one or more secondary network node devices. The flow control unit 520 is configured to decide downlink flow control information based on the measured downlink transmission information. The sending unit 530 is configured to send the downlink flow control information to at least the first network node device. In some implantations, the sending unit 530 may be configured to send the downlink via a piggyback signaling or a data plane signaling.

According to one or more embodiments of the present disclosure, the sending unit 530 may be configured to further send the downlink flow control information to the one or more secondary network node devices.

According to one or more embodiments of the present disclosure, the downlink transmission information measured by the terminal device may include, among others, signal qualities for the first network node device and the one or more secondary network node devices, which can be measured directly at the terminal side by using any appropriate signal quality estimation scheme.

Additionally or alternatively, the downlink transmission information may include, among others, downlink scheduling information for the first network node device and the one or more secondary network node devices. This information may be available at terminal side if the terminal device is also designed to assist radio resource allocation of the downlink multi-point diversity mode.

Additionally or alternatively, the downlink transmission information may also include, among others, a downlink transmission status, which can be determined from the received data packet by the terminal device. In one example embodiment of the present disclosure where the flow control scheme is implemented based on a PDCP layer, the downlink transmission status may be measured by a highest sequence number of PDCP data units that the terminal device successfully received. In another example embodiment of the present disclosure where the flow control scheme is implemented based on a RLC layer, the downlink transmission status may be measured by a receiving sliding window status in the RLC layer; and already-received stream sequence numbers or non-received stream sequence numbers.

Although the downlink transmission information has been described in conjunction with the above specific examples, it should be noted that the downlink transmission information that can be used by the terminal device to make the flow control decision may not be limited to those examples and any of their combinations. Those skilled in the art may select, additionally or alternatively, any other suitable parameters or measurements for downlink transmission so as to facilitate the flow control decision at the terminal device.

According to one or more embodiments of the present disclosure, the flow control unit 520 may be configured to decide downlink flow control information at least by determining which network node device is connected based on the signal qualities for the first network node device and the one or more secondary network node devices.

Additionally and alternatively, in one or more embodiments of the present disclosure, the flow control unit 520 may be configured to decide downlink flow control information at least by determining from which packet the first network node device and the one or more secondary network node subsequently deliver the duplicated packets to the terminal device, based on the downlink transmission status.

Figure 6:
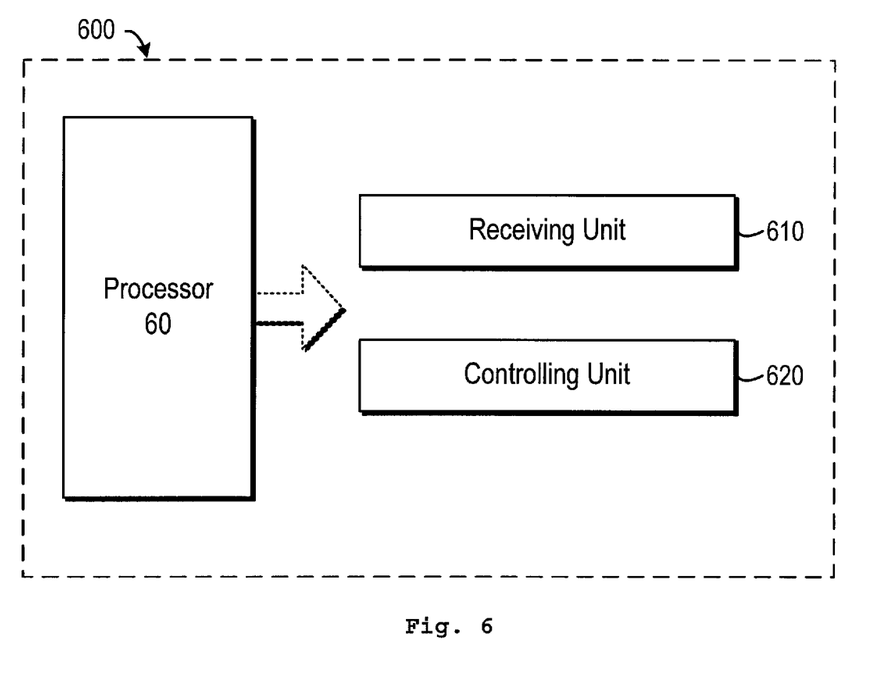
FIG. 6 is an example block diagram illustrating a first network node device according to one or more embodiments of the present disclosure.

FIG. 6 is an example block diagram illustrating a first network node device 600 according to one or more embodiments of the present disclosure.

As shown in FIG. 6, the first network node device 600 is configured to serve a terminal device to operate in the downlink multi-point diversity scenario where the first network node device 600 along with one or more secondary network node devices transmits duplicated packets to the terminal device. The first network node device 600 comprises: a receiving unit 610, a controlling unit 620. The first network node device 600 may also comprise suitable radio frequency transceivers (not shown in FIG. 6) that may be selectively coupled with one or more antenna (s) (not shown in FIG. 6) which are used to transmit signals to, and receive signals from, one or more terminal devices.

The first network node device 600 comprises a processor 60, which may include one or more microprocessor or microcontrollers, as well as other digital hardware, which may include digital signal processors (DSPs), special-purpose digital logic, and the like. The processor 60 may be configured to execute program code stored in memory (not shown in FIG. 6), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processor 60 may be used to cause the receiving unit 610, the controlling unit 620 to perform corresponding functions according one or more embodiments of the present disclosure.

The receiving unit 610 is configured to receive from the terminal device downlink flow control information which is decided by the terminal device. The control unit 620 is configured to perform subsequent data delivery based on the downlink flow control information.

According to one or more embodiments of the present disclosure, the downlink flow control information may include information indicating which network node device is connected based on the signal qualities for the first network node device and the one or more secondary network node devices. In some embodiments of the present disclosure, the downlink flow control information may additionally or alternatively include information indicating from which packet the first network node device and the one or more secondary network node subsequently deliver the duplicated packets to the terminal device.

According to one or more embodiments of the present disclosure, the first network node device 600 may further comprise a sending unit (not shown in FIG. 6) configured to send the downlink flow control information to each of the one or more secondary network node devices via backhaul.

According to one or more embodiments of the present disclosure, the control unit 620 may be configured to decide network flow control information based on the downlink flow control information. In those embodiments, while taking the downlink flow control information into consideration, the first network node device 600 may also make its own flow control decision to decide network flow control information. The first network node device 600 may further comprise a second sending unit (not shown in FIG. 6) configured to inform each of the secondary network nodes of the resulted network flow control information instead of relaying the received flow control information from the terminal device.

According to one or more embodiments of the present disclosure, the terminal device is allowed to make a decision of the downlink flow control based on its internal measurement of the downlink transmission information for the first and secondary network node devices, which is serving the terminal device in the downlink multi-point diversity mode. In this way, the flow control reactivation speed can be increased because unnecessary backhaul latency introduced by inter-network-node communications and radio link latency introduced by the measurement feedback from the terminal device can be avoided.

In general, the various exemplary embodiments may be implemented in hardware or special purpose circuits, software, logical or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block and signaling diagrams, it is well understood that these blocks, apparatus, systems, techniques or methods described herein may be implemented in, as non-limiting examples, hardware, software, firmware, special purpose circuits or logical, general purpose hardware or controller or other computing devices, or some combination thereof.

As such, it should be appreciated that at least some aspects of the exemplary embodiments of the disclosure may be practiced in various components such as integrated circuit chips and modules. As well known in the art, the design of integrated circuits is by and large a highly automated process.

The present disclosure may also be embodied in the computer program product which comprises all features capable of implementing the method as depicted herein and may implement the method when loaded to the computer system.

The present disclosure has been specifically illustrated and explained with reference to the preferred embodiments. The skilled in the art should understand various changes thereto in form and details may be made without departing from the spirit and scope of the present disclosure.

What is claimed is:

1. A method for operating in a terminal device for downlink flow control, the terminal device receiving duplicated packets from a first network node device and one or more secondary network node devices, the method comprising:
    measuring downlink transmission information for the first network node device and the one or more secondary network node devices, wherein the downlink transmission information includes at least one item selected from a group containing:
        signal qualities for the first network node device and the one or more secondary network node devices;
        downlink scheduling information for the first network node device and the one or more secondary network node devices; and
        a downlink transmission status based on the received duplicated packets;
    deciding downlink flow control information based on the measured downlink transmission information; and
    sending the downlink flow control information to at least the first network node device.

2. The method of claim 1, further comprising:
    sending the downlink flow control information to the one or more secondary network node devices.

3. The method of claim 1, wherein the downlink transmission status is measured by:
    a highest sequence number of packet data convergence protocol data units that the terminal device successfully received.

4. The method of claim 1, wherein the downlink transmission status is measured by:
    a receiving sliding window status in a radio link control layer; and
    already-received stream sequence numbers or non-received stream sequence numbers.

5. The method of claim 1, wherein deciding the downlink flow control information based on the measured downlink transmission information comprises:
    determining which network node device is connected based on the signal qualities for the first network node device and the one or more secondary network node devices.

6. The method of claim 1, wherein deciding the downlink flow control information based on the measured downlink transmission information comprises:
    determining from which packet the first network node device and the one or more secondary network node devices subsequently deliver the received duplicated packets to the terminal device, based on the downlink transmission status.

7. The method of claim 1, wherein the downlink flow control information is sent via a piggyback signaling.

8. The method of claim 1, wherein the downlink flow control information is sent by a data plane signaling.

9. A method for operating in a first network node device for downlink flow control, the first network node device along with one or more secondary network node devices transmitting duplicated packets to a terminal device, the method comprising:
    receiving, from the terminal device, downlink flow control information which is decided by the terminal device, wherein the downlink flow control information is decided by downlink transmission information which includes at least one item selected from a group containing:
        signal qualities for the first network node device and the one or more secondary network node devices;
        downlink scheduling information for the first network node device and the one or more secondary network node devices; and
        a downlink transmission status based on the received duplicated packets; and
    performing subsequent data delivery based on the downlink flow control information.

10. The method of claim 9, further comprising:
    sending the downlink flow control information to each of the one or more secondary network node devices via backhaul.

11. The method of claim 9, wherein the downlink flow control information includes information indicating which network node device is connected based on the signal qualities for the first network node device and the one or more secondary network node devices.

12. The method of claim 9, wherein the downlink flow control information includes information indicating from which packet the first network node device and the one or more secondary network node devices subsequently deliver the received duplicated packets to the terminal device.

13. The method of claim 9, wherein the downlink flow control information is received via a piggyback signaling.

14. The method of claim 9, wherein the downlink flow control information is received via a data plane signaling.

15. The method according to claim 9, wherein performing the subsequent data delivery based on the downlink flow control information comprises:
   deciding network flow control information based on the downlink flow control information; and
   the method further comprises:
   informing the one or more secondary network node devices of the network flow control information.

16. A terminal device, the terminal device receiving duplicated packets from a first network node device and one or more secondary network node devices, the terminal device comprising a processor and memory containing instructions executable by the processor, the processor being adapted to:
   cause to measure downlink transmission information for the first network node device and the one or more secondary network node devices, wherein the downlink transmission information includes at least one item selected from a group containing:
      signal qualities for the first network node device and the one or more secondary network node devices;
      downlink scheduling information for the first network node device and the one or more secondary network node devices; and
      a downlink transmission status based on the received duplicated packets;
   cause to decide downlink flow control information based on the measured downlink transmission information; and
   cause to send the downlink flow control information to at least the first network node device.

* * * * *